United States Patent
Rodriguez

(10) Patent No.: US 6,748,491 B2
(45) Date of Patent: Jun. 8, 2004

(54) DESIGNING A CACHE USING AN LRU-LFU ARRAY

(75) Inventor: Jorge R. Rodriguez, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 09/838,607

(22) Filed: Apr. 19, 2001

(65) Prior Publication Data

US 2002/0194432 A1 Dec. 19, 2002

(51) Int. Cl.$^7$ ............................................. G06F 12/08
(52) U.S. Cl. ..................... 711/122; 711/129; 711/132; 711/136
(58) Field of Search ................................ 711/122, 129, 711/136, 132

(56) References Cited

U.S. PATENT DOCUMENTS

| | | | | |
|---|---|---|---|---|
| 4,186,438 A | | 1/1980 | Benson et al. | 364/200 |
| 4,458,310 A | * | 7/1984 | Chang | 711/119 |
| 4,463,424 A | | 7/1984 | Mattson et al. | 364/300 |
| 4,503,501 A | | 3/1985 | Coulson et al. | 364/300 |
| 5,043,885 A | | 8/1991 | Robinson | 364/200 |
| 5,357,623 A | * | 10/1994 | Megory-Cohen | 711/129 |
| 5,394,531 A | * | 2/1995 | Smith | 711/136 |
| 5,537,635 A | * | 7/1996 | Douglas | 711/129 |
| 5,751,993 A | | 5/1998 | Ofek et al. | 395/463 |
| 5,822,562 A | | 10/1998 | Dahlen et al. | 395/497.01 |
| 5,892,937 A | | 4/1999 | Caccavale | 395/462 |
| 5,966,726 A | * | 10/1999 | Sokolov | 711/113 |
| 6,012,126 A | | 1/2000 | Aggarwal et al. | 711/133 |
| 6,067,608 A | | 5/2000 | Perry | 711/203 |
| 6,072,830 A | | 6/2000 | Proctor et al. | 375/240 |
| 6,088,767 A | * | 7/2000 | Dan et al. | 711/129 |
| 6,105,103 A | | 8/2000 | Courtright, II et al. | 711/1 |
| 6,141,731 A | * | 10/2000 | Beardsley et al. | 711/136 |
| 6,330,556 B1 | * | 12/2001 | Chilimbi et al. | 707/2 |
| 6,370,619 B1 | * | 4/2002 | Ho et al. | 711/129 |
| 6,378,043 B1 | * | 4/2002 | Girkar et al. | 711/133 |
| 6,470,419 B2 | * | 10/2002 | Take et al. | 711/113 |
| 6,493,800 B1 | * | 12/2002 | Blumrich | 711/129 |
| 6,507,893 B2 | * | 1/2003 | Dawkins et al. | 711/133 |
| 6,542,967 B1 | * | 4/2003 | Major | 711/134 |

FOREIGN PATENT DOCUMENTS

JP 11-39120 2/1999

OTHER PUBLICATIONS

J. Gecsei, D. R. Slutz, and I. L. Traiger, "Evaluation Techniques for Storage Hierarchies," *IBM Systems Journal*, No. 2, 1970, pp. 78–117.

(List continued on next page.)

*Primary Examiner*—Hiep T. Nguyen
(74) *Attorney, Agent, or Firm*—Winstead Sechrest & Minick

(57) ABSTRACT

A system, computer program product and method for designing a cache. A server in a network system, e.g., file system, database system, may receive requests forming a workload. A trace may be performed on the workload to provide information such as the frequency count for each Logical Block Address (LBA) requested in the workload. The trace may then be analyzed by grouping the LBA's with the same frequency count and determining the number of groups counted in the trace. Upon analyzing the trace, an LRU-LFU cache may be designed. An LRU-LFU cache may comprise one or more stacks of cache entries where the number of stacks corresponds to the number of frequency groups counted in the trace. Each particular stack may then have a length based on the number of logical addresses with the same frequency count associated with that particular stack.

20 Claims, 8 Drawing Sheets

OTHER PUBLICATIONS

R. Karedla, J. S. Love, B. G. Wherry, "Caching Strategies to Improve Disk System Performance," *IEEE Computer*, Mar. 1994, pp. 38–46.

E. J. O'Neil, P. E. O'Neil, and G. Weikum, "The LRU–K Page Replacement Algorithm for Database Disk Buffering," *Proc. ACM SIGMOD Int'l Conf. On Management of Data*, 1993, pp. 297–306.

J. T. Robinson and M. V. Devarakonda, "Data Cache Management Using Frequency–Based Replacement," *Proc. Of ACM Conf. on Measurements and Modeling*, 1990, pp. 134–142.

D. Thiebaut, H. S. Stone, J. L. Wolf, "Improving Disk Cache Hit–Ratios Through Cache Partitioning," *IEEE Transactions on Computers*, vol. 41, No. 6, Jun. 1992, pp. 665–676.

Peter Buneman et al., "Proceedings of the 1993 ACM SIGMOD International Conference on Management of Data," SIGMOD Record, vol. 22, Issue 2, Jun. 1993, pp. 297–306.

* cited by examiner

DESIGNING A CACHE USING AN LRU-LFU ARRAY

CROSS REFERENCE TO RELATED APPLICATION

The present invention is related to the following U.S. Patent Application which is incorporated herein by reference:

Ser. No. 09/838,433 entitled "Designing a Cache with Adaptive Reconfiguration" filed Apr. 19, 2001.

TECHNICAL FIELD

The present invention relates to the field of cache design, and more particularly to designing a cache using a Least Recently Used (LRU)—Least Frequently Used (LFU) array thereby improving the performance of the cache.

BACKGROUND INFORMATION

A network server, e.g., file server, database server, web server, may be configured to receive requests from clients in a network system to read from or write to a disk, e.g., disk drive, in the network server. These requests may form what is commonly referred to as a "workload" for the network server. That is, a workload may refer to the requests that need to serviced by the network server.

Typically, a server in a network system comprises a disk adapter that bridges the disk, e.g., disk drive, to the processing unit of the server unit. A server may further comprise a cache commonly referred to as a disk cache within the disk adapter to increase the speed of accessing data. A cache is faster than a disk and thereby allows data to be read at higher speeds. Thus, if data is stored in the cache it may be accessed at higher speeds than accessing the data on the disk.

There have been many methods in designing disk caches that seek to increase the cache hit rate thereby improving performance of the disk cache. A "cache hit" is said to occur if an item, e.g., data, requested by the processor in the server or a client in a network system, is present in the disk cache. When an item, e.g., data, requested by the processor in the server or a client in the network system, is not present in the cache, a "cache miss" is said to occur. A "cache hit rate" may refer to the rate at which cache hits occur. By improving the cache hit rate, the performance of the system may be improved, i.e., less data needs to be serviced from the disk.

One method to improve the performance of a disk cache is commonly referred to as the Least Recently Used (LRU) replacement method as illustrated in FIG. 1. The LRU replacement method uses a single stack 101 comprising a set of cache entries where each cache entry stores particular data. As stated above, if an item, e.g., data, requested by the processor in the server or client in a network system is present in the cache, a "cache hit" is said to occur. When a cache hit occurs, the cache entry comprising the information, e.g., data, requested moves to the first stack position as illustrated in FIG. 1. As stated above, if an item, e.g., data, requested by the processor in the server or client in a network system is not present in the cache, a "cache miss" is said to occur. When a cache miss occurs, the requested item is retrieved from the disk and then stored in the first stack position as illustrated in FIG. 1. When a new entry is inserted in stack 101, the cache entry in the last stack position of stack 101 is evicted. The information, e.g., data, may subsequently be discarded.

Another method to improve the performance of a disk cache is commonly referred to as the Segmented LRU (S-LRU) replacement method as illustrated in FIG. 2. The S-LRU replacement method may use two stacks 201A–B. Each stack, stack 201A–B, may comprise a set of cache entries where each cache entry stores particular data. When a cache hit occurs in the first stack, e.g., stack 201A, the cache entry comprising the information, e.g., data, requested moves up to the first stack position of the second stack, e.g., stack 201B, as illustrated in FIG. 2. When a new entry is added to stack 201B, the cache entry at the last stack position of stack 201B is evicted to the first stack position of stack 201A. When a new entry is inserted in stack 201A, the cache entry at the last stack position of stack 201A is evicted. The information, e.g., data, may subsequently be discarded. When a cache hit occurs in the second stack, e.g., stack 201B, the cache entry comprising the information, e.g., data, requested moves up to the first stack position of that stack, e.g., stack 201B, as illustrated in FIG. 2. When a new entry is inserted in stack 201B, the cache entry at the last stack position of stack 201B is evicted to the first stack position of stack 201A. When a new entry is inserted in stack 201A, the cache entry at the last stack position of stack 201A is evicted. The information, e.g., data, may subsequently be discarded. When a cache miss occurs, the requested item is retrieved from the disk and then stored in the first stack position of the first stack, e.g., stack 201A, as illustrated in FIG. 2. When a new entry is inserted in stack 201A, the cache entry at the last stack position of stack 201A is evicted. The information, e.g., data, may subsequently be discarded.

Unfortunately, these methods of cache design do not effectively configure a cache to handle the workload requests efficiently. That is, these methods do not efficiently use memory space thereby improving the cache hit rate since the cache is not designed based on an analysis of the workload.

It would therefore be desirable to develop a cache based on an analysis of the workload thereby improving performance of the cache, i.e., improving the cache hit rate, using a Least Recently Used (LRU)—Least Frequently Used (LFU) array.

SUMMARY

The problems outlined above may at least in part be solved in some embodiments by designing a Least Recently Used (LRU)—Least Frequently Used (LFU) cache array based on an analysis of the workload.

In one embodiment of the present invention, a method for designing a cache may comprise the step of a server in a network system, e.g., file system, database system, receiving requests, e.g., read from or write to a disk in the server, from one or more clients. These requests may form a workload comprising the requests that need to be serviced by the server. A trace may be performed on the workload to provide information such as the frequency count for each Logical Block Address (LBA) referenced in the workload, i.e., the number of times each particular LBA was referenced. The trace may then be analyzed by grouping the LBA's with the same frequency count and determining the number of groups counted in the trace. Upon analyzing the trace, an LRU-LFU cache may be designed based on the analysis of the trace. An LRU-LFU cache may comprise one or more stacks of cache entries where the number of stacks corresponds to the number of frequency groups counted in the trace. Each particular stack may then have a length based on the number of logical addresses with the same frequency count associated with that particular stack. Stacks may be arranged in an array from most frequently used to least frequently used.

That is, the stack associated with the highest frequency count may be located at the highest level of the array and the stack associated with the lowest frequency count may be located at the lowest level of the array. The cache entries in each particular stack may be arranged from most recently used to least recently used based on a logical time stamp associated with each particular cache entry. The logical time stamp may indicate the time the information, e.g., data, in the associated cache entry was requested. Upon the storing of a new cache entry in a particular stack, a cache entry located at the least recently used stack position may be evicted. When the cache entry is evicted, the information, e.g., data, associated with the evicted cache entry may be discarded.

In another embodiment of the present invention, the cache entries evicted may be stored at the most recently used stack position in the next higher level stack except if the cache entry is located in the highest level cache of the cache array. In another embodiment of the present invention, the cache entries evicted may be stored at the most recently used stack position in the next lower level stack except if the cache entry is located in the lowest level cache of the cache array.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a system, computer program product and method for designing a cache. In one embodiment of the present invention, a server in a network system, e.g., file system, database system, may receive requests, e.g., read from or write to a disk in the server, from one or more clients. These requests may form a workload comprising the requests that need to be serviced by the server. A trace may be performed on the workload to provide information such as the frequency count for each Logical Block Address (LBA) referenced in the workload, i.e., the number of times each particular LBA was referenced. The trace may then be analyzed by grouping the LBA's with the same frequency count and determining the number of groups counted in the trace. Upon analyzing the trace, an LRU-LFU cache may be designed based on the analysis of the trace. An LRU-LFU cache may comprise one or more stacks of cache entries where the number of stacks corresponds to the number of frequency groups counted in the trace. Each particular stack may then have a length based on the number of logical addresses with the same frequency count associated with that particular stack. Stacks may be arranged in an array from most frequently used to least frequency used. That is, the stack associated with the highest frequency count may be located at the highest level of the array and the stack associated with the lowest frequency count may be located at the lowest level of the array. The cache entries in each particular stack may be arranged from most recently used to least recently used based on a logical time stamp associated with each particular cache entry. The logical time stamp may indicate the time the information, e.g., data, in the associated cache entry was requested. It is noted that even though the following discusses the present invention in connection with a disk cache the present invention may be implemented in any type of cache including a memory cache and a filter cache.

Figure 1:
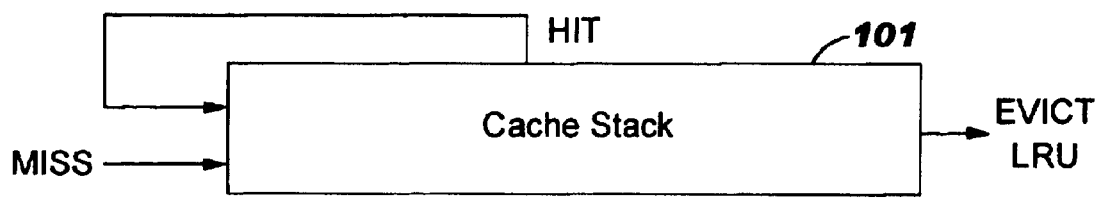
FIG. 1 illustrates an embodiment of the Least Recently Used replacement method for designing a cache.
Figure 2:
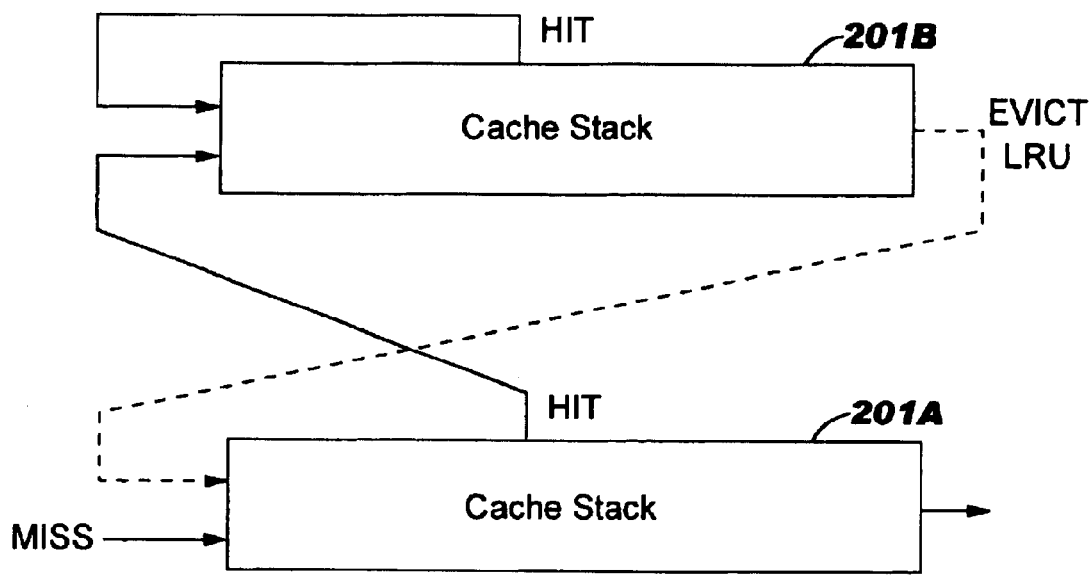
FIG. 2 illustrates an embodiment of the Segmented Least Recently Used replacement method for designing a cache.
Figure 3:
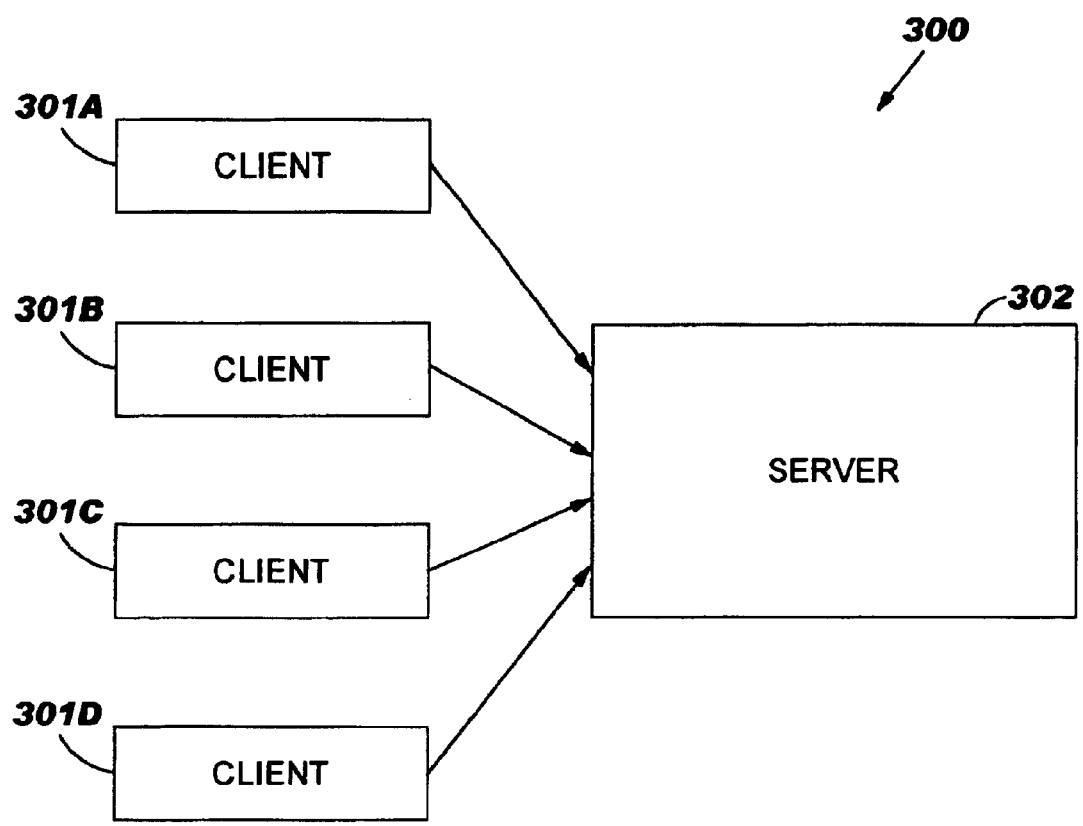
FIG. 3 illustrates an embodiment of a network system configured in accordance with the present invention.

FIG. 3—Network System

FIG. 3 illustrates one embodiment of the present invention of a network system 300. Network system 300 may comprise one or more clients 301A–D configured to send requests to a server 302, e.g., file server, database server, web server. Clients 301A–D may collectively or individually be referred to as clients 301 or client 301, respectively. It is noted that system 300 may comprise any number of clients 301 and that FIG. 3 is illustrative. It is further noted that network system 300 may be any type of system such as a file system or a database system and that FIG. 3 is not to be limited in scope to any one particular embodiment.

FIG. 4—Server

Figure 4:
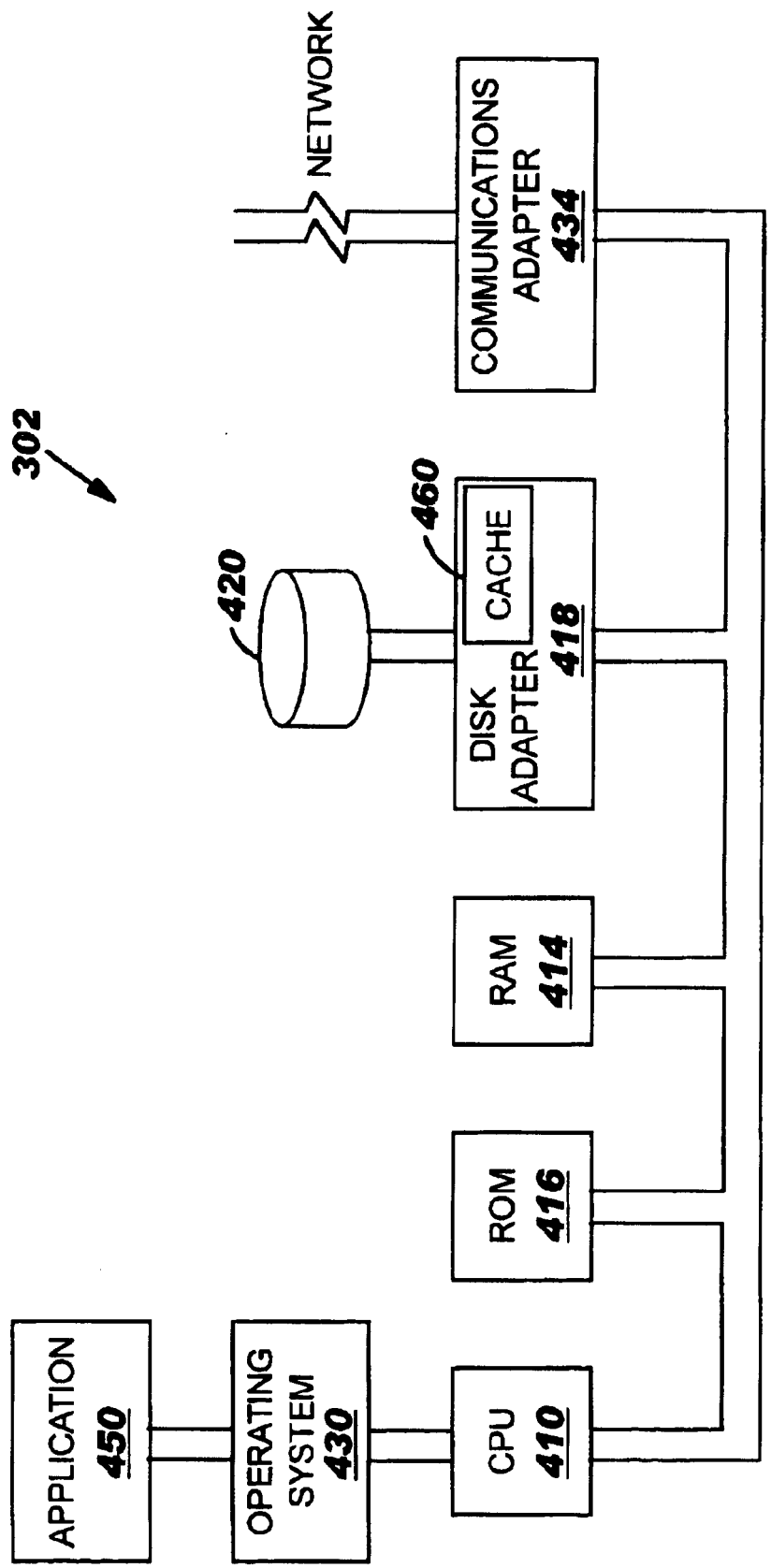
FIG. 4 illustrates an embodiment of the present invention of a server.

FIG. 4 illustrates an embodiment of the present invention of server 302. Referring to FIGS. 3 and 4, one or more clients 301 may issue requests to read from or write to a disk 420 in server 302. It is noted that the embodiment of the present invention is not limited to read and/or write requests but any requests that require service from server 302. As stated in the Background Information section, these requests may form what is commonly referred to as a workload. That is, a workload may refer to the requests that need to be serviced by server 302. In one embodiment, the workload may be managed by a disk adapter 418. If these requests in the workload may be serviced by a disk cache 460 within disk adapter 418 instead of disk 420, then the data requested may be accessed faster. Therefore, it is desirable to optimize the disk cache 460 so that as many requests may be serviced by disk cache 460 as possible. It is noted that disk cache 460 may reside in other locations than disk adapter 418, e.g., disk unit 420, application 450. A method for designing a cache, e.g., disk cache 460, with an improved performance, i.e., services more requests, using a Least Recently Used (LRU)—Least Frequently Used (LFU) array is described in the description of FIG. 5.

Referring to FIG. 4, server 302 may further comprise a central processing unit (CPU) 410 coupled to various other components by system bus 412. An operating system 440 runs on CPU 410 and provides control and coordinates the function of the various components of FIG. 4. Application 450, e.g., program for designing a cache, e.g., disk cache 460, as described in FIG. 5, runs in conjunction with operating system 440 which implements the various functions to be performed by application 450. Read only memory (ROM) 416 is coupled to system bus 412 and includes a basic input/output system ("BIOS") that controls certain basic functions of server 302. Random access memory (RAM) 414, disk adapter 418 and communications adapter 434 are also coupled to system bus 412. It should be noted that software components including operating system 440 and application 450 are loaded into RAM 414 which is the computer system's main memory. Disk adapter 418 may be a small computer system interface ("SCSI") adapter that communicates with disk units 420, e.g., disk drive. It is noted that the program of the present invention that designs a cache, e.g., disk cache 460, as described in FIG. 5 may reside in disk unit 420 or in application 450. Communications adapter 434 interconnects bus 412 with an outside network enabling server 302 to communicate with clients 301 or other such systems. Input/Output devices are also connected to system bus 412 via a user interface adapter 422 and a display adapter 436.

Implementations of the invention include implementations as a computer system programmed to execute the method or methods described herein, and as a computer program product. According to the computer system implementations, sets of instructions for executing the method or methods are resident in the random access memory 414 of one or more computer systems configured generally as described above. Until required by server 302, the set of instructions may be stored as a computer program product in another computer memory, for example, in disk drive 420 (which may include a removable memory such as an optical disk or floppy disk for eventual use in disk drive 420). Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 5:
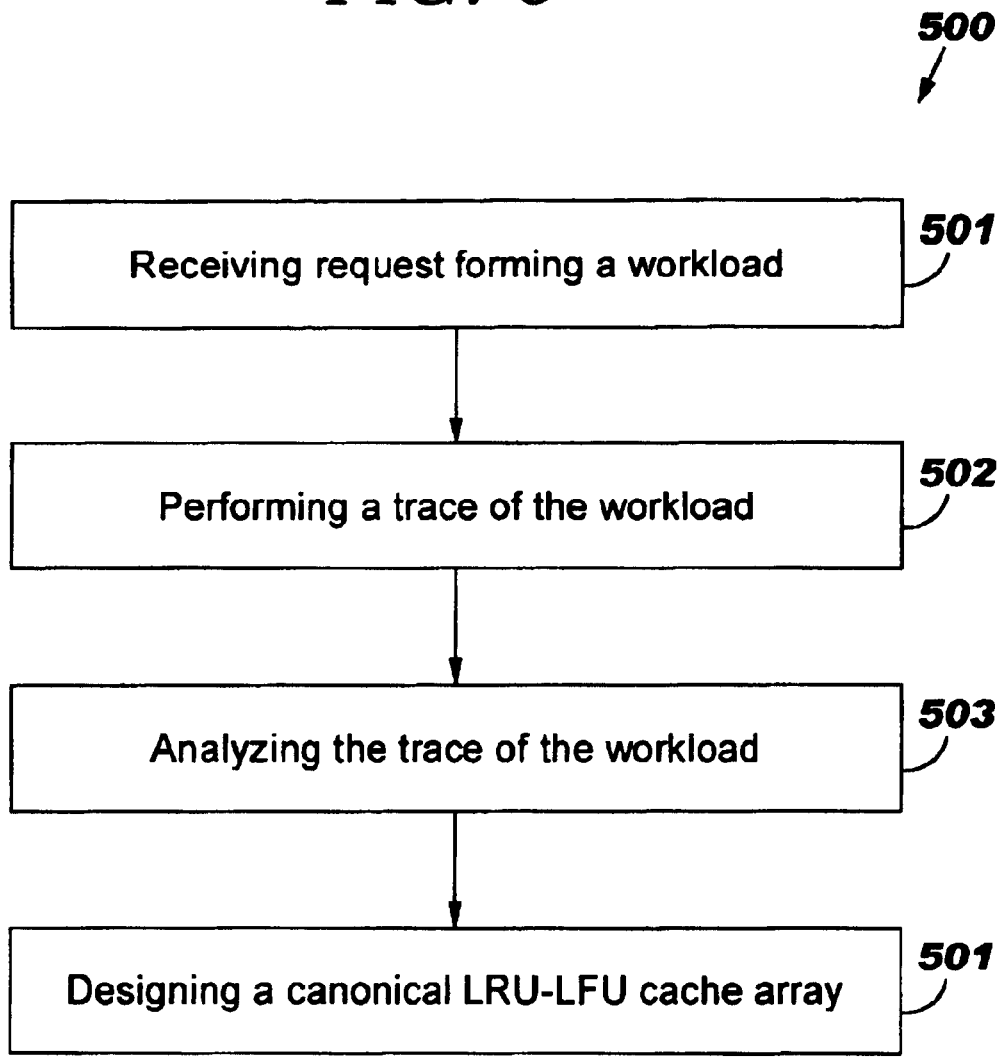
FIG. 5 is a flowchart of a method for designing a cache using an LRU-LFU array.

FIG. 5—Method for Designing a Cache

FIG. 5 is a flowchart of one embodiment of the present invention of a method 500 for designing a cache, e.g., disk cache 460, using a Least Recently Used (LRU)—Least Frequently Used (LFU) array. As stated in the Background Information section, prior art methods of designing caches do not effectively design a cache to handle workload requests efficiently. That is, prior art cache design methods do not design caches that efficiently use memory space since the cache is not designed based on an analysis of the workload. It would therefore be desirable to develop a cache based on an analysis of the workload thereby improving performance of the cache, i.e., improving the cache hit rate using a Least Recently Used (LRU)—Least Frequently Used (LFU) array. Method 500 is a method for designing a cache that uses an LRU-LFU array.

In step 501, server 302 may be configured to receive requests from one or more clients 301 forming a workload. The workload may comprise requests to read from and/or write to disk 420 of server 302. It is noted that the workload may comprise any number of requests. It is further noted that in one embodiment, the workload, i.e., request stream, may be managed by disk adapter 418. It is further noted that the embodiment of the present invention is not limited to read and/or write requests but any requests that require service from server 302.

In step 502, a trace may be performed on the request stream from clients 301, i.e., a trace may be performed on the workload. In one embodiment, the trace may be performed on the request stream in disk adapter 418. In one embodiment, the trace may provide information as to the frequency count for each particular Logical Block Address (LBA) referenced in the workload, i.e., the number of times each particular Logical Block Address (LBA) was referenced. In step 503, the trace may be analyzed by grouping LBA's with the same frequency count and determining the number of groups counted as illustrated in the exemplary Table 1 below.

TABLE 1

| Frequency Count | Number of Different Addresses in Trace for Each Particular Frequency Count | Total Number of Requests |
| --- | --- | --- |
| 1 | 9521 | 9521 |
| 2 | 2369 | 4738 |
| 3 | 565 | 1695 |
| 4 | 287 | 1148 |
| 5 | 210 | 1050 |
| 6 | 237 | 1422 |
| 7 | 507 | 3549 |
| 8 | 1018 | 8144 |
| 9 | 305 | 2745 |
| 10 | 225 | 2250 |
| 11 | 104 | 1144 |
| 12 | 70 | 840 |
| 13 | 26 | 338 |
| 14 | 39 | 546 |
| 15 | 305 | 4575 |
| 16 | 306 | 4896 |
| 17 | 12 | 204 |
| 18 | 1 | 18 |
| 19 | 3 | 57 |
| 20 | 1 | 20 |
| 22 | 1 | 22 |
| 23 | 1 | 23 |
| 24 | 2 | 48 |
| 27 | 1 | 27 |
| 32 | 7 | 224 |
|  |  | 49244 |

Table 1 above illustrates an example of a trace conducted on 49,244 requests in a particular workload. The first column of Table 1 indicates the frequency count measured for each particular group. The second column of Table 1 indicates the number of different logical addresses with the same frequency count. The third column of Table 1 indicates the total number of requests in the trace for each particular frequency count by multiplying the frequency count for that group with the number of different logical addresses with that particular frequency count. Table 1 indicates that there were twenty-five different frequency count groups. Table 1 further indicated that no logical address was referenced more than thirty-two times and that not logical address was referenced with a frequency count of 21, 25, 26, 28, 29, 30 or 31 times. In a cache memory, the longer that logical addresses with frequency counts two or greater remain in the cache, the higher a hit rate may be achieved. The higher the hit rate the greater the performance of the cache. Method 500 is a method that improves the cache hit rate by designing a cache based upon the analysis of the trace in step 503 as explained in greater detail below.

Figure 6:
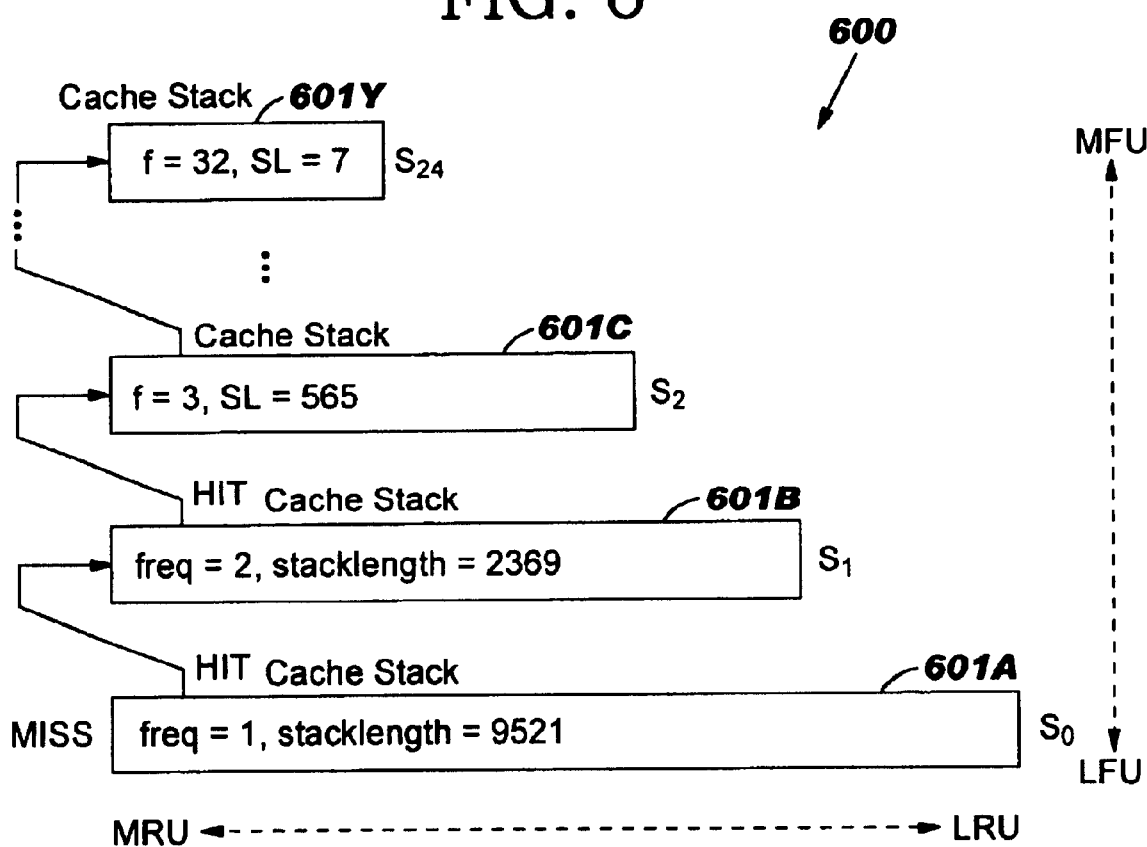
FIG. 6 illustrates an embodiment of an LRU-LFU cache array configured in accordance with the present invention.

In step 504, an LRU-LFU cache array may be designed based on the analysis of the trace in step 503. A basic structure of an LRU-LFU cache array based on the analysis of the trace as illustrated in Table 1 is depicted in FIG. 6. FIG. 6 illustrates an embodiment of an LRU-LFU cache array 600 based on the analysis of the trace as illustrated in Table 1. LRU-LFU cache array 600 comprises a plurality of stacks 601A–601Y corresponding to the number of frequency count groups in Table 1, e.g., twenty-five different frequency groups in Table 1. That is, each stack of cache array 600, stacks 601A–601Y, is associated with a particular frequency count group. For example, stack 601A is associated with the frequency count group of one, i.e., associated with logical addresses referenced once. Stack 601B is associated with the frequency count group of two, i.e., associated with logical addresses referenced twice. Stack 601C is associated with the frequency count group of three, i.e., associated with logical addresses referenced three times. Stack 601X is associated with the frequency count group of thirty-two, i.e., associated with logical addresses referenced thirty-two times. Stacks 601A–601Y may collectively or individually be referred to as stacks 601 or stack 601, respectively. It is noted that LRU-LFU cache array 600 may comprise one or more stacks 601 which are dependent upon the number of frequency count groups indicated in the trace analyzed in step 503 and that FIG. 6 is illustrative.

Referring to FIG. 6, the length of each particular stack 601 corresponds to the number of logical addresses with the same frequency count. For example, there were 9,521 different logical addresses with a frequency count of 1 as indicated in Table 1. Subsequently, stack 601A which is a stack 601 associated with a frequency count of 1 has a length of 9,521.

Figure 7:
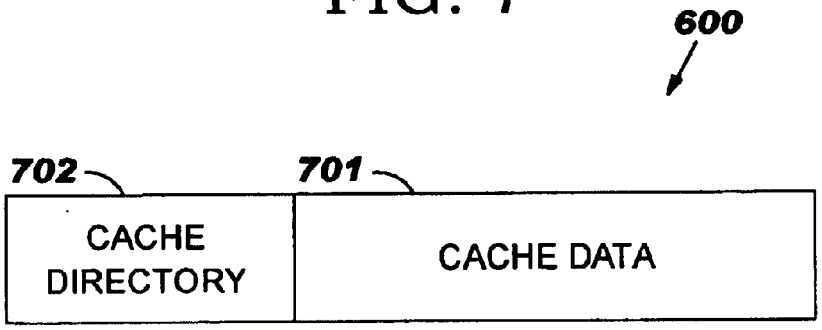
FIG. 7 illustrates an embodiment of an LRU-LFU cache comprising two logical portions configured in accordance with the present invention.

Cache array 600 may comprise two logical portions, e.g., data storage area 701 and cache directory 702 as illustrated in FIG. 7. FIG. 7 illustrates an embodiment of present invention of cache array 600 comprising two logical portions. It is noted that cache array 600 may comprise a different number of logical portions and that FIG. 7 is illustrative. Referring to FIG. 7, a first logical portion is a data storage area 701 where data storage area 701 comprises a set of cache entries where each cache entry stores particular data. A second logical portion is a cache directory 702 storing the logical base addresses associated with the cache entries in data storage area 701. Cache directory 702 may further be configured to store a logical time stamp associated with each cache entry in data storage area 701 indicating the time the information, e.g., data, in the associated cache entry was requested. Cache directory 702 may further be configured to store the frequency count associated with each cache entry in cache array 600 where the frequency count indicates the number of times the information, e.g., data, in the associated cache entry was requested.

Referring to FIG. 6, the cache entries in each particular stack 601, e.g., stacks 601A–X, may be ordered within stack 601 from most recently used to least recently used based on the logical time stamps of the cache entries. That is, the cache entry whose logical time stamp indicates the most recent time entry of all the cache entries in stack 601 is placed in the first stack position in stack 601. The cache entry whose logical time stamp indicates the last time entry of all the cache entries in stack 601 is placed in the last stack position in stack 601.

Referring to FIG. 6, stacks 601A–X may be ordered from most frequently used to least frequently used. For example, stack 601A is located on the lowest level of the array since the frequency count group associated with stack 601A is one. Stack 601X is located on the highest level of the array since the frequency count group associated with stack 601X is thirty-two which corresponds to the highest number of times one or more logical addresses were referenced in the workload. It is noted that cache array 600 may comprise one or more stacks 601 based on the number of frequency count groups identified in the analysis of the trace in step 503. For example, if there were three frequency count groups identified in the analysis of the trace in step 503, then there would be three stacks 601 in cache array 600. It is further noted that more than one frequency count group may be grouped in a particular stack 601. For example, a developer may establish that stack 601A is associated with a frequency count of Co, e.g., two, and stack 601B is associated with a frequency count of Cl, e.g., five. That is, stack 601A may store cache entries associated with logical addresses that have been referenced Co, e.g., two, or less times. Stack 601B may store cache entries associated with logical addresses that have been referenced greater than the frequency count, e.g., Co, associated with the next lower level stack 601, e.g., stack 601A, and less than or equal to Cl, e.g., five, times. A generic template for an LRU-LFU cache array 800 illustrating such design constraints by a developer is illustrated in FIG. 8.

Figure 8:
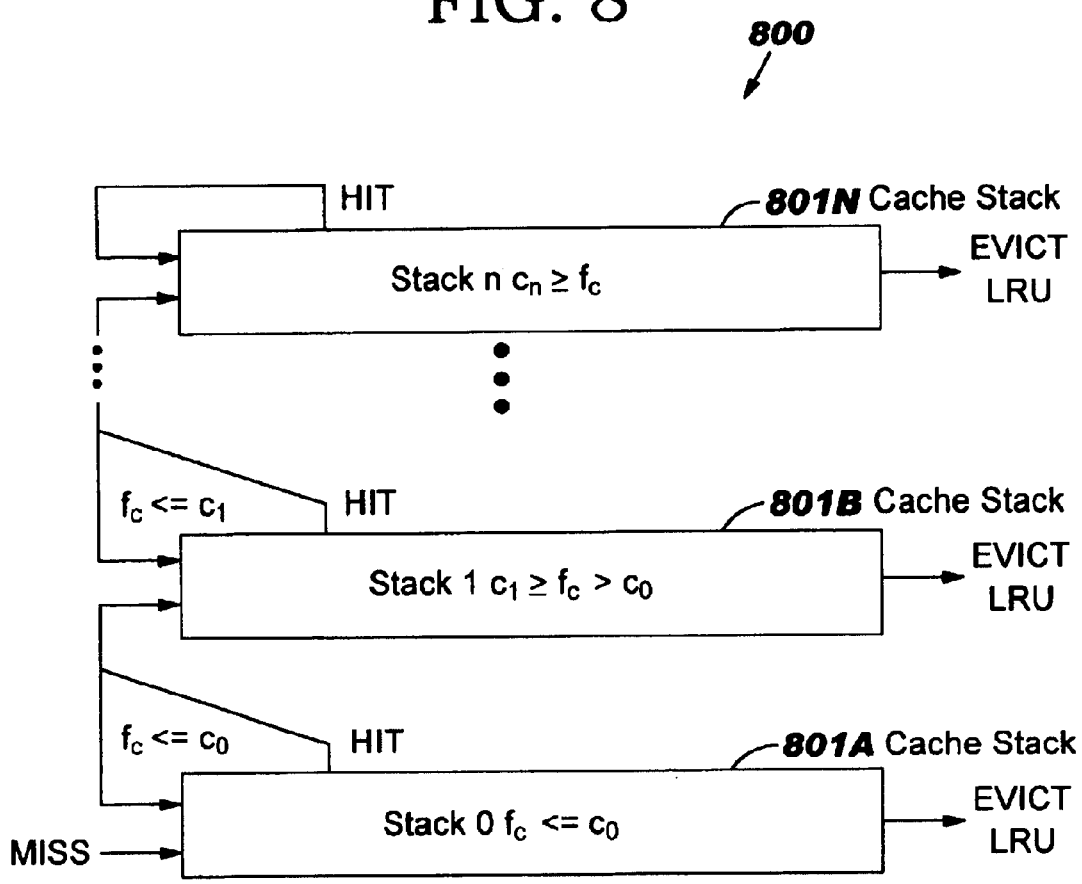
FIG. 8 illustrates an embodiment of a template for an LRU-LFU cache array configured in accordance with the present invention.

FIG. 8 illustrates an embodiment of the present invention of a generic template for an LRU-LFU cache array 800. Cache array 800 may comprise one or more stacks 801, e.g., stacks 801A–N, where the one or more stacks 801 are ordered based on the frequency count. For example, stack 801A is associated with a frequency count group of Co. That is, the logical addresses associated with each of the cache entries in stack 801A have been referenced $C_0$ or less times. Stack 801B is associated with a frequency count group of $C_1$. That is, the logical addresses associated with each of the cache entries in stack 801B have been referenced greater than the frequency count, e.g., $C_0$, associated with the next lower level stack 801, e.g., stack 801A, and less than or equal to $C_1$ times. Stack 801N is associated with a frequency count group of $C_N$. That is, the logical addresses associated with each of the cache entries in stack 801N have been referenced greater than the frequency count associated with the next lower level stack 801 and less than or equal to $C_N$ times.

FIG. 8 further illustrates that cache array 800 may be volatile. That is, the cache entries in the one or more stacks 801 of cache array 800 may vary when a cache hit or cache miss occurs. FIG. 8 further illustrates that upon the storing of a new cache entry in a particular stack 801 at the most recently used stack position a cache entry at the least recently used stack position in that particular stack 801 may be evicted. When the cache entry in the least recently used stack position is evicted, the information stored in the least recently used stack position may be discarded.

When an item, e.g., data, requested is present in a particular cache entry a "cache hit" is said to occur. When a cache hit occurs in a particular stack 801, e.g., stack 801A, the frequency count associated with that cache entry is updated, i.e., increased by one, in the cache directory. If the updated frequency count associated with that particular cache entry subsequently increases in number to the frequency count, e.g., $C_1$, associated with the next higher level stack 801, e.g., stack 801B, then that particular cache entry may be stored in the most recently used stack position in the next higher level stack 801, e.g., stack 801B. Upon storing the particular cache entry in the most recently used stack position in the next higher level stack 801, e.g., stack 801B, the cache entry in the least recently used stack position in the next higher level stack 801, e.g., stack 801B, may be evicted. If the updated frequency count associated with that particular cache does not increase in number to the frequency count, e.g., $C_1$, associated with the next higher level stack 801, e.g., stack 801B, then that particular cache entry may be stored in the most recently used stack position in its particular stack 801, e.g., stack 801A.

When an item, e.g., data, requested is not present in a particular cache entry a "cache miss" is said to occur. When a cache miss occurs, the requested item, e.g., data, may be retrieved from disk 420 and then stored in the most recently used stack position of the lowest level stack, e.g., stack 801A, as illustrated in FIG. 8. When a new entry is inserted in stack 801A, the cache entry in the least recently used stack position of stack 801A may be evicted. The information, e.g., data, in the cache entry in the least most recently used stack position may subsequently be discarded.

Figure 9:
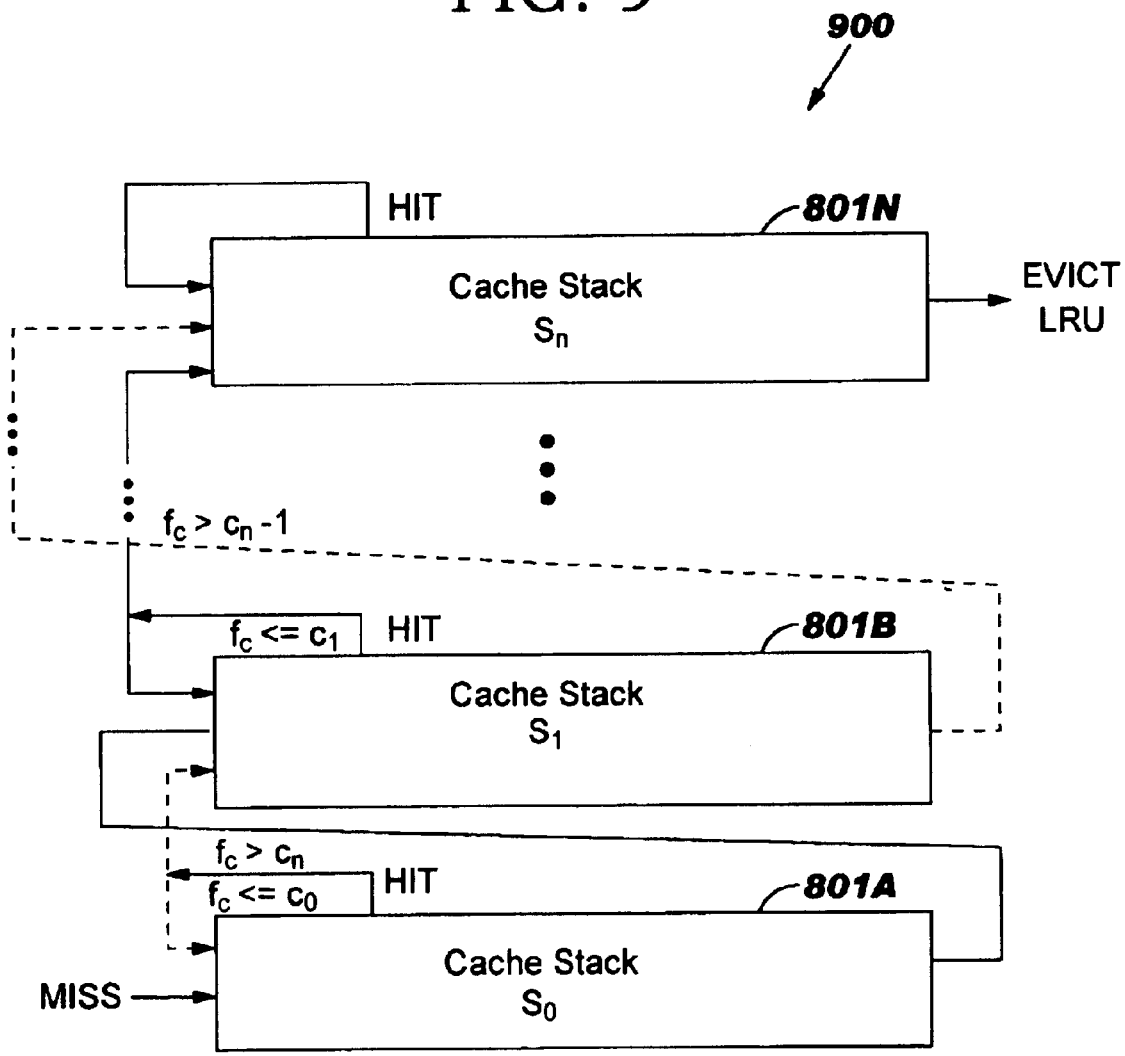
FIG. 9 illustrates another embodiment of an LRU-LFU cache array configured in accordance with the present invention where an evicted cache entry may be stored in the most recently used stack position in the next higher level stack.

In another embodiment, the cache entry in a particular stack 801 evicted may be stored at the most recently used stack position in the next higher level stack 801 in the LRU-LFU cache array as illustrated in FIG. 9. FIG. 9 illustrates an embodiment of the present invention of a cache array 900 that is the same as cache array 900 except that the cache entries evicted in a particular stack 801 may be stored at the most recently used stack position in the next higher level stack 801 except if the cache entry evicted is located in the highest level stack 801 of the cache array. For example, a cache entry evicted in the least recently used stack position in the lowest level stack 801, e.g., stack 801A, of cache array 900 may be stored in the most recently used stack position in the next higher level stack 801, e.g., stack 801B. The cache entry evicted in the least recently used stack position in 801B of cache array 900 may be stored in the most recently used stack position in the next higher level stack 801, e.g., stack 801C. The information in the cache entry evicted in the least recently used stack position in the highest level stack 801, e.g., stack 801N, of cache array 900 may be discarded since there are no more stacks 801 located above stack 801N in cache array 900.

Figure 10:
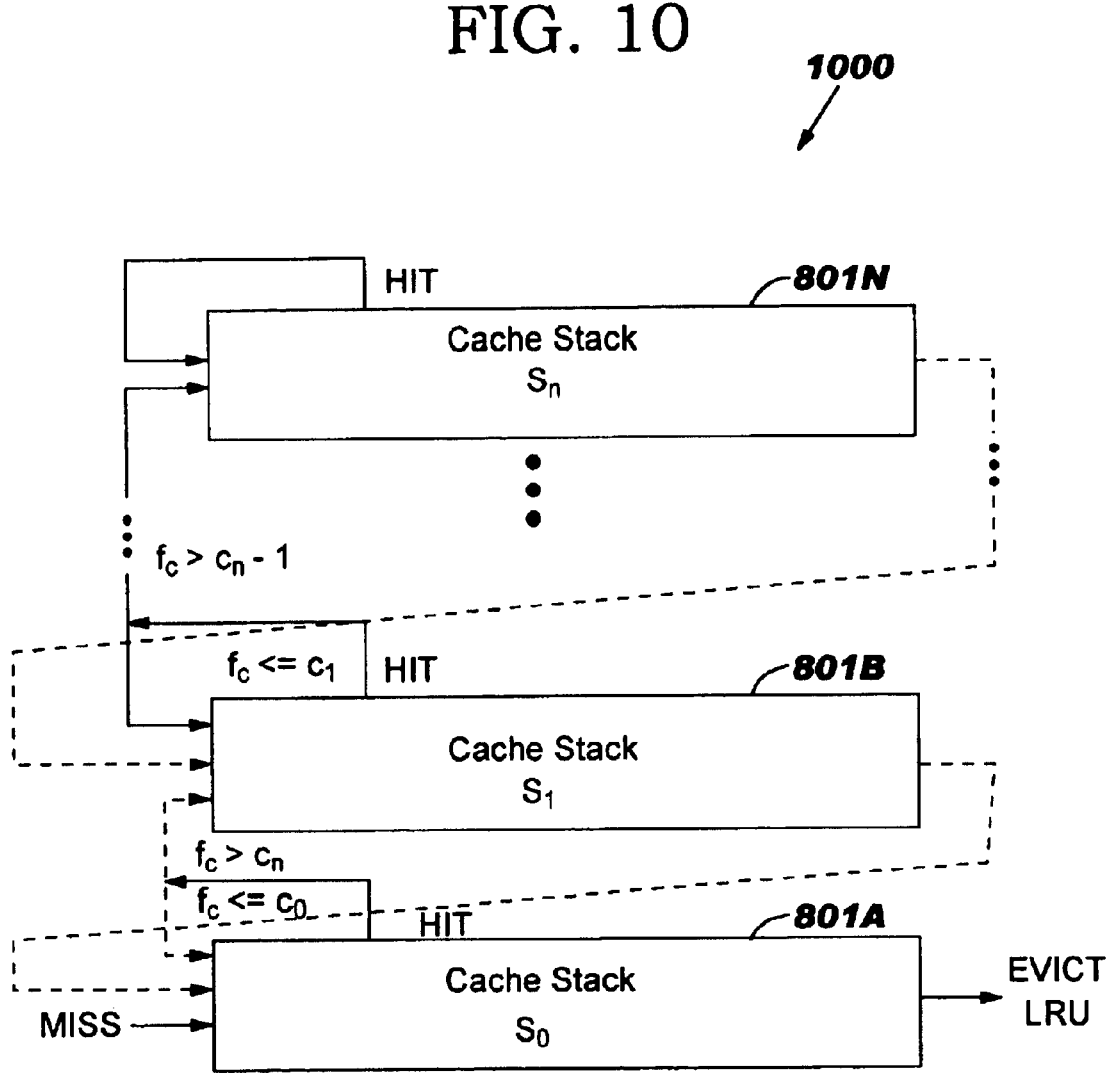
FIG. 10 illustrates another embodiment of an LRU-LFU cache array configured in accordance with the present invention where an evicted cache entry may be stored in the most recently used stack position in the next lower level stack.

In another embodiment, the cache entry in a particular stack 801 evicted may be stored at the most recently used stack position in the next lower level stack 801 in the LRU-LFU cache array as illustrated in FIG. 10. FIG. 10 illustrates an embodiment of the present invention of a cache array 1000 that is the same as cache array 1000 except that the cache entries evicted in a particular stack 801 may be stored at the most recently used stack position in the next lower level stack 801 except if the cache entry evicted is located in the lowest level stack 801 in the cache array. For example, a cache entry evicted in the least recently used stack position in the highest level stack 801, e.g., stack 801N, of cache array 1000 may be stored in the most recently used stack position in the next lower level stack 801, e.g., stack 801B. The cache entry evicted in the least recently used stack position in 801B of cache array 1000 may be stored in the most recently used stack position in the next lower level stack 801, e.g., stack 801A. The information in the cache entry evicted in the least recently used stack position in the lowest level stack 801, e.g., stack 801A, of cache array 1000 may be discarded since there are no more stacks 801 located below stack 801A in cache array 1000.

It is noted that for simplicity the features, e.g., evicting cache entries in the least recently used stack position, discussed in FIGS. 8–10 in relation to cache arrays 800, 900, 1000, respectively, were not explicitly illustrated in FIG. 6 in relation to cache array 600 but are apparent to one of ordinary skill in the art.

Although the system, computer program product and method are described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

What is claimed is:

1. A method for designing a cache comprising the steps of:

receiving requests forming a workload;

performing a trace of said workload;

analyzing said trace of said workload; and designing one or more stacks of cache entries based on said analysis of said trace of said workload;

wherein said cache comprises a plurality of logical sections, wherein one of said plurality of logical sections comprises information, wherein one of said plurality of logical sections comprises a cache directory;

wherein said cache directory in said cache comprises a logical time stamp associated with each cache entry in said cache;

wherein each of said one or more one or more stacks comprises cache entries ordered from most recently used to least recently used based on said logical time stamps of said cache entries;

wherein a cache entry at a least recently used stack position in a particular stack is evicted upon the storing of a new cache entry at a most recently used stack position in said particular stack;

wherein said evicted cache entry is stored at said most recently used stack position of a next higher level stack except when said particular stack is a highest level stack.

2. A system, comprising:

a processor; and a memory unit coupled to said processor, wherein said memory unit is operable for storing a computer program for designing a cache;

wherein said processor, responsive to said computer program, comprises:

circuitry operable for receiving requests forming a workload;

circuitry operable for performing a trace of said workload;

circuitry operable for analyzing said trace of said workload; and circuitry operable for designing one or more stacks of cache entries based on said analysis of said trace of said workload;

wherein said cache comprises a plurality of logical sections, wherein one of said plurality of logical sections comprises information, wherein one of said plurality of logical sections comprises a cache directory;

wherein said cache directory in said cache comprises a logical time stamp associated with each cache entry in said cache;

wherein each of said one or more one or more stacks comprises cache entries ordered from most recently used to least recently used based on said logical time stamps of said cache entries;

wherein a cache entry at a least recently used stack position in a particular stack is evicted upon the storing of a new cache entry at a most recently used stack position in said particular stack;

wherein said evicted cache entry is stored at said most recently used stack position of a next higher level stack except when said particular stack is a highest level stack.

3. A method for designing a cache comprising the steps of:

receiving requests forming a workload;

performing a trace of said workload;

analyzing said trace of said workload; and logically ordering a plurality of stacks of cache entries based on said analysis of said trace of said workload;

wherein said plurality of stacks are ordered in an array based on a frequency count of said cache entries, wherein said plurality of stacks are ordered from most frequently used to least frequently used.

4. The method as recited in claim 3, wherein each of said plurality of stacks comprises cache entries ordered from most recently used to least recently used.

5. The method as recited in claim 3, wherein said cache entries are ordered from most recently used to least recently used using a logical time stamp associated with each cache entry.

6. The method as recited in claim 3, wherein a cache entry in a least recently used stack position in a first stack of said plurality of stacks is evicted upon storing a new cache entry in a most recently used stack position in said first stack.

7. The method as recited in claim 6, wherein said evicted cache entry is stored in a most recently used stack position of a next lower level stack except when said first stack is a lowest level stack.

8. The method as recited in claim 6, wherein said evicted cache entry is stored in a most recently used stack position of a next higher level stack except when said first stack is a highest level stack.

9. A computer program product embodied in a machine readable medium for designing a cache comprising the programming steps of:

receiving requests forming a workload;

performing a trace of said workload;

analyzing said trace of said workload; and logically ordering a plurality of stacks of cache entries based on said analysis of said trace of said workload;

wherein said plurality of stacks are ordered in an array based on a frequency count of said cache entries, wherein said plurality of stacks are ordered from most frequently used to least frequently used.

10. The computer program product as recited in claim 9, wherein each of said plurality of stacks comprises cache entries ordered from most recently used to least recently used.

11. The computer program product as recited in claim 10, wherein said cache entries are ordered from most recently used to least recently used using a logical time stamp associated with each cache entry.

12. The computer program product as recited in claim 10, wherein a cache entry in a least recently used stack position in a first stack of said plurality of stacks is evicted upon storing a new cache entry in a most recently used stack position in said first stack.

13. The computer program product as recited in claim 12, wherein said evicted cache entry is stored in a most recently used stack position of a next lower level stack except when said first stack is a lowest level stack.

14. The computer program product as recited in claim 12, wherein said evicted cache entry is stored in a most recently used stack position of a next higher level stack except when said first stack is a highest level stack.

15. A system, comprising:

a processor; and a memory unit coupled to said processor, wherein said memory unit is operable for storing a computer program for designing a cache;

wherein said processor, responsive to said computer program, comprises:

circuitry operable for receiving requests forming a workload;

circuitry operable for performing a trace of said workload;

circuitry operable for analyzing said trace of said workload; and circuitry operable for logically ordering a plurality of stacks of cache entries based on said analysis of said trace of said workload;

wherein said plurality of stacks are ordered in an array based on a frequency count of said cache entries, wherein said plurality of stacks are ordered from most frequently used to least frequently used.

16. The system as recited in claim 15, wherein each of said plurality of stacks comprises cache entries ordered from most recently used to least recently used.

17. The system as recited in claim 16, wherein said cache entries are ordered from most recently used to least recently used using a logical time stamp associated with each cache entry.

18. The system as recited in claim 16, wherein a cache entry in a least recently used stack position in a first stack of said plurality of stacks is evicted upon storing a new cache entry in a most recently used stack position in said first stack.

19. The system as recited in claim 18, wherein said evicted cache entry is stored in a most recently used stack position of a next lower level stack except when said first stack is a lowest level stack.

20. The system as recited in claim 18, wherein said evicted cache entry is stored in a most recently used stack position of a next higher level stack except when said first stack is a highest level stack.

* * * * *

UNITED STATES PATENT AND TRADEMARK OFFICE
CERTIFICATE OF CORRECTION

PATENT NO. : 6,748,491 B2  Page 1 of 1
DATED : June 8, 2004
INVENTOR(S) : Jorge R. Rodriguez It is certified that error appears in the above-identified patent and that said Letters Patent is hereby corrected as shown below:

Column 11,
Lines 22 and 26, please replace "3" with -- 4 --.

Signed and Sealed this

Third Day of May, 2005

JON W. DUDAS
*Director of the United States Patent and Trademark Office*